United States Patent Office 2,958,604
Patented Nov. 1, 1960

2,958,604
SILICA GLASS

Henri J. C. George, Paris, France, assignor to Quartz & Silice S.A., Paris, France, a corporation of the Republic of France No Drawing. Filed July 10, 1957, Ser. No. 670,868

Claims priority, application France July 13, 1956

4 Claims. (Cl. 106—52)

This invention consists in a novel visibly transparent silica glass and in a process of making the same. The product is particularly useful in applications where the glass is to be subjected to high energy electro-magnetic radiation, e.g. ultra-violet, X-rays, or gamma rays, or to bombardment by high intensity beams of nuclear particles, e.g. alpha and beta rays, and neutrons.

When ordinary glass, that is window glass or plate glass as known to the art, is exposed to high energy electro-magnetic or nuclear radiation, a noticeable blackening occurs. Glasses particularly suited for such exposure have been developed by incorporating significant proportions of cerium oxide which has been found to prevent this blackening effect. Where however such glass is exposed to nuclear energy a further problem arises from the fact that the glass itself tends to be rendered radio-active by the exposure. Glasses heretofore known generally contain elements which will become radio-active upon exposure, such as boron and the alkali and alkaline-earth metals, and also contain amounts of cerium which upon exposure may yield proportions of radioactive isotopes which are quite dangerous. Glasses containing as little as 1% cerium, of which some 88.4% is cerium 140, will yield radio-active cerium 141 in significant amounts. For example, a beam of $10^{13}$ neutrons per second will induce a radio-activity of 319 millicuries per gram of glass irradiated with a period of 28 days (the half life of cerium 141). Such a high radio-activity has necessitated protective measures for operators working in nuclear energy installations where glass of this type is used.

The present invention provides a silica glass which may be rendered only very slightly radio-active but which suffers no loss of transparency on exposure to high-energy radiation. The glass of this invention may accordingly be used advantageously in nuclear installations where its transparency may be appreciated without any significant concomitant induced radio-activity.

In general the silica glass of this invention consists of substantially pure vitreous silica in combination with a small and limited proportion of cerium oxide together with which the silica is fused. The cerium oxide is conveniently incorporated by adding a solution of a cerium salt to granulated pure silica (e.g. quartz) preliminary to its fusion to silica glass, and then adding a volatile base to precipitate cerium hydroxide. The granulated silica is then dried and fused to yield a product consisting essentially of pure silica and cerium oxide.

The amount of cerium necessary to attain effect is generally between about $5 \times 10^{-4}$ and $10^{-3}$ parts of cerium expressed as $CeO_2$ per part of silica.

In preparing the silica glass of this invention, quartz is typically the beginning material. It is prepared for fusion by crushing and screening to particles between about 60 and 200 mesh (Tyler series) distributed to give optimum packing. The crystal particles are initially washed thoroughly and then mixed with a solution of the cerium salt in an amount equivalent to the desired final amount of cerium oxide. A base is then added to the crystal-salt mixture to precipitate out cerium hydroxide, and the by-products of the precipitation are removed. If a volatile base, such as ammonia, is used to precipitate the cerium hydroxide, and if the acid component of the cerium salt forms a volatile salt with the volatile base, the reaction by-products may be volatilized from the silica-cerium hydroxide mixture. Otherwise other procedures are used to remove the reaction by-products, e.g.. repeated washings or dialysis.

Any of numerous soluble salts of cerium are suitable, such as the bromate, bromide, iodide, nitrate, sulfate, and chloride.

After the cerium hydroxide has been combined with the silica, the mixture is dried and is then fused and cooled to form the vitreous silica product of the invention, and for that purpose the procedure described in the co-pending application of Henri George, Serial No. 516,560, filed June 20, 1955, may be advantageously used.

The preferred manner of practicing this invention is described in detail in the following example.

Quartz crystals are initially ground and screened to yield a starting material of between 50 and 200 mesh with the following size distribution:

| | Percent by weight |
|---|---|
| 50–80 mesh | 45 |
| 80–120 mesh | 30 |
| 120–200 mesh | 25 |

The granulated crystals are first boiled with concentrated (35%) hydrochloric acid, rinsed repeatedly in distilled water until no trace of acid remains, and are then dried.

A solution of cerium chloride, $CeCl_3$, C.P. grade of concentration .212% in distilled water is added to the dried pure quartz crystals in an amount of about 250 cc. of solution per kilogram of crystals and the two are thoroughly mixed, preferably by using a rod of silica glass. This amount of solution is such as will substantially fill the interstitial voids in the crystals without leaving a supernatant layer.

Cerium hydroxide is now precipitated among the crystals by adding 20 cc. of a solution of ammonia (4n) per kilogram of crystal, and mixing it thoroughly until the mixture appears absolutely uniform throughout. The crystals are now dried at 200° C. and are re-screened (to break up lumps which may have formed) e.g. through a nylon screen having 22 meshes per inch, and then are finally fused.

The formation of cerium hydroxide by the addition of ammonia is expressed in the following formula:

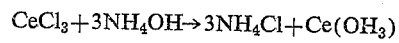

$$CeCl_3 + 3NH_4OH \rightarrow 3NH_4Cl + Ce(OH)_3$$

Fusion is preferably carried out under a vacuum in an electric induction furnace, such as in the manner described in the above-identified co-pending application Serial No. 516,560, filed June 20, 1955, or may alternately be carried out by other well-known techniques under non-oxidizing conditions.

After fusion, the silica glass is cooled and further processed into tubings, vessels, windows, or other articles in conventional manner.

The silica glass produced in this manner is characterized by an absorption band in the ultra-violet range having a peak at about 3200 A.U. but none in the infra-red range at 2.76 microns. The glass does not blacken noticeably on exposure to electro-magnetic or nuclear radiation and is rendered only very slightly radio-active when bombarded by nuclear particles. Whereas a neutron beam of $10^{13}$ neutrons per second will induce a radio-activity of about 319 millicuries per gram in prior art glass containing upwards of 1% cerium expressed as $CeO_2$, the same exposure will induce a radio-activity of only 300 microcuries in the silica glass of this invention.

Accordingly the glass of this invention is well suited for such uses in nuclear energy installations, such as in the manufacture of ampules for liquids to be exposed to radiation, windows exposed to nuclear radiation, optical devices designed for the examination of radio-active articles, to name but a few.

Although described with particular reference to the preferred embodiment it is contemplated that obvious modifications of the details will occur to those skilled in the art and that such may be made without departing from the scope of this invention. For instance, other soluble cerium salts may be used, as may other bases for causing the precipitation of cerium hydroxide. It should be borne in mind, however, that the silica going into the product should be substantially pure and that all other material except cerium hydroxide should be removed from the product.

Having thus disclosed by invention and described in detail a preferred embodiment thereof, I claim and desire to secure by Letters Patent:

1. A transparent silica glass consisting of substantially pure silicon dioxide containing cerium oxide in an amount of between about $0.5 \times 10^{-4}$ and $10^{-3}$ parts of cerium oxide expressed as $CeO_2$ per part of silicon dioxide.

2. The method of preparing a silica glass stable when exposed to electro-magnetic and nuclear radiation comprising combining and mixing substantially pure silicon dioxide with cerium oxide in an amount of between about $0.5 \times 10^{-4}$ and $10^{-3}$ parts of cerium oxide expressed as $CeO_2$ per part of silicon dioxide, fusing the mixture, and cooling the fused mixture to form silica glass.

3. The method of preparing transparent silica glass comprising combining and mixing particulate substantially pure silicon dioxide with an aqueous solution of a water soluble cerium compound having an amount of cerium of between about $0.5 \times 10^{-4}$ and $10^{-3}$ parts expressed as $CeO_2$ per part of silicon dioxide, adding a base to said mixture to precipitate cerium hydroxide, removing the by-products resulting from said precipitation, drying the mixture of silicon dioxide and cerium hydroxide, then fusing the mixture and cooling it to form silica glass.

4. The method of preparing transparent silica glass comprising combining and mixing particulate substantially pure silicon dioxide with a solution of a cerium salt of an acid forming a volatile ammonium salt, the amount of the cerium salt being between about $0.5 \times 10^{-4}$ and $10^{-3}$ parts expressed as $CeO_2$ per part of silicon dioxide, adding ammonia to said mixture to precipitate cerium hydroxide, drying the mixture of silicon dioxide and cerium hydroxide, then fusing and cooling the mixture to form silica glass.

References Cited in the file of this patent

UNITED STATES PATENTS

| | | |
|---|---|---|
| 1,414,715 | Taylor | May 2, 1922 |
| 1,637,439 | Coblentz | Aug. 2, 1927 |
| 2,515,938 | Stookey | July 18, 1950 |